Figure 1:
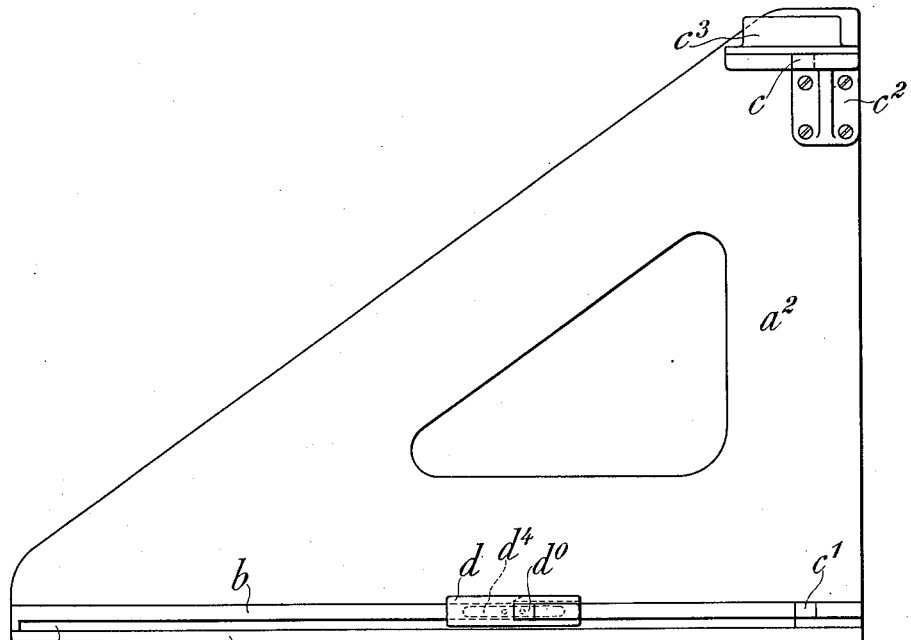

O. MACKENSEN.
SIGHTING INSTRUMENT FOR AERIAL USE.
APPLICATION FILED MAR. 24, 1914.

1,143,719.

Patented June 22, 1915.

Witnesses:
Paul Krüger
Fritz Sander

Inventor:
Otto Mackensen

UNITED STATES PATENT OFFICE.

OTTO MACKENSEN, OF JENA, GERMANY, ASSIGNOR TO THE FIRM OF CARL ZEISS, OF JENA, GERMANY.

SIGHTING INSTRUMENT FOR AERIAL USE.

1,143,719.  Specification of Letters Patent.  Patented June 22, 1915.

Application filed March 24, 1914. Serial No. 826,888.

*To all whom it may concern:*

Be it known that I, OTTO MACKENSEN, a citizen of the German Empire, residing at Jena, Germany, have invented a new and useful Sighting Instrument for Aerial Use, of which the following is a specification.

The invention relates to instruments for determining the angle, by which the connecting line of an aerial vessel in motion with an object on the ground aimed at has to deviate, at the moment of releasing a projectile, from the vertical, if the projectile is to hit the said object. According to a well-known method of determining this angle of deviation, the time taken by an object in traversing a certain angle of the field of view is ascertained. Heretofore, in order to make the setting of the angle of deviation with the aid of a scale possible, the said angle of the field of view was always made equal, so that, as the size of this angle, which is equal for all heights, must be so chosen that for small heights of flight the time taken by an object aimed at to traverse the said angle is of practical use, the said time becomes disadvantageously long for great heights. Now, if, in order to minimize this disadvantage, the size of the angle in the field of view, as has been occasionally done heretofore, be chosen step by step for different heights of flight in such a manner that suitable times of observation always result, with every degree of height, for which a special angle of the field of view is chosen, a special scale must be provided for the setting of the angle of deviation, or—when the setting of the said angle is effected, after its size has been obtained from a table—a special table must be provided.

Now an instrument according to the invention makes it possible to compensate the relative differences of the times of observation at different heights in accordance with the requirements in each case (while avoiding the above named disadvantages when setting the angle of deviation), by a particular angle of the field of view, which decreases as the height increases, being, with the help of a scale marked in height-values, coördinated to each height. When it has been decided, how the angle of the field of view is to lie with regard to the vertical, with the aid of the following well-known relations of the angle of the field view, the angle of deflection, the height of flight and the speed of the air vessel to each other the general rule may easily be given, according to which the graduation of the scale for the setting of the angle of the field of view and the connection of the said scale with the device for varying the size of the latter are to be carried out.

For an air vessel flying at the speed $v$ at the height $H$ the angle of deviation $\alpha$, by which the connecting line of the vessel and an object aimed at must be inclined to the vertical at the moment of releasing a projectile, is determined, if the projectile is to hit the said object and the air resistance be left out of account, by the well-known equation $$\tan \alpha = \frac{v\sqrt{\frac{2H}{g}}}{H} \quad (1).$$

The positions of the angle of the field of review with relation to the vertical, which are the most important in practice, are that one, in which one of the sides of the angle of the field of view coincides for all heights with the vertical line, and that one, in which the said angle extends for all heights by the same amount to both sides of the vertical. In the former of these two special cases (*i. e.*, where for all heights one of the sides of the said angle of the field of view coincides with the vertical), if $\beta$ stands for the said angle and $t$ is the time taken by the object observed to pass through the angle $\beta$, the following equation holds good:

$$v = \frac{H}{t} \tan \beta \quad (2).$$

On substituting this value for $v$ in equation 1, the following equation is obtained:

$$\tan \alpha = \frac{\tan \beta \sqrt{\frac{2H}{g}}}{t} \quad (3).$$

Hence, when it is desired to effect the setting of the angle of deviation with the aid of a non-spatial scale, which is only possible, when not more than two variable quantities are to be taken into account, the angle of the field of view must be dependent on the height of flight, when it is not to be, as heretofore, the same size for all heights. As, further, in an instrument according to the invention the time of observation is not to increase with an increasing height of flight, the dependent condition between the angle of the field of view and the height of flight must be capable of being expressed by an equation, according to which with an increase in the height of flight the angle of the field of view becomes less. The scale and its connection with the device for varying the size of the angle of the field of view may, for instance, be so chosen, that the angle of the field of view appertaining to any height-value of the scale is in each case so great that the equation $$\tan \beta = \frac{C}{H^k}$$

is fulfilled, in which $C$ and $k$ are constants of the apparatus.

When, in accordance with the second of the above named special cases, the angle of the field of view extends for all heights equally far to both sides of the vertical, the following equation holds good:

$$v = \frac{H}{t} 2 \tan \frac{\beta}{2} \quad (4).$$

If this value be substituted for $v$ in equation 1, the following equation is obtained:

$$\tan \alpha = \frac{2 \tan \frac{\beta}{2} \sqrt{\frac{2H}{g}}}{t} \quad (5).$$

In this case the setting of the angle of deviation can be effected, when the angle of the field of view decreases with increasing height, with one and the same scale for all heights, for instance, when $$\tan \frac{\beta}{2} = \frac{C}{H^k}.$$

Taking as a basis for the graduation of the scale serving for the setting of the angle of the field of view the equation $$\tan \beta = \frac{C}{H^k}$$

or the equation $$\tan \frac{\beta}{2} = \frac{C}{H^k},$$

those instruments may be specially mentioned, for which the constant $k$ is equal to 1 or $\frac{1}{2}$. For $k=1$, for instance, when the former of the two cases obtains, $$\tan \beta = \frac{C}{H},$$

so that equation (2) may be written $$t = \frac{C}{v} \quad (6).$$

For every height of flight the time taken by an object to traverse the angle of the field of view then depends only on the speed of the aerial vessel. Hence, when the scale and its connection with the device for varying the size of the angle of the field of view is so chosen that $$\tan \beta = \frac{C}{H},$$

for equal speeds of flight the time of observation is the same for all heights. It may be also emphasized, that in this case in place of the time of flight or next to it the speed of the aerial vessel can be marked on the arrangement showing the duration of observation.

When the constant $k$ is chosen equal to $\frac{1}{2}$, the same case being again taken as above, then $$\tan \beta = \frac{C}{\sqrt{H}}$$

and equation (3) may be written $$\tan \alpha = \frac{C \sqrt{\frac{2}{g}}}{t} \quad (7).$$

Hence, when the said scale and its connection with the device for varying the size of the angle of the field of view are so chosen that $$\tan \beta = \frac{C}{\sqrt{H}},$$

only a single variable quantity has to be taken into account, on setting the angle of deviation, so that after ascertaining the time taken by an object to traverse the angle of the field of view, the angle of deviation, which would be necessary, if the projectile were to fall *in vacuo*, can be set to a scale of one dimension, which is marked in time-values. When, however, the air resistance is to be taken into account, a scale of two dimensions must be provided in this case as well, which can then be constructed in just the same manner, as is necessary in all other cases, even when the air resistance is not taken into account.

The scale for setting the angle of deviation can with advantage be formed in such a manner that a number of lines, the height-lines, are cut by a number of curves, the time-lines, the latter lines being, for any optional disposition of the height-lines, the connecting curves of such points on the height-lines as in each case determine for the height corresponding to the particular height-line the necessary angle of deviation for one and the same time of observation. If the air resistance be neglected, the angles of deviation may be easily ascertained with the aid of the equations given above, and the time-curves consequently determined. On taking the air resistance into account, however, the angle of deviation must be smaller than the one that is required for the falling of the projectile *in vacuo*, height and time of observation being the same in both cases, as the air resistance decreases the horizontal distance traveled by the projectile. This circumstance can easily be allowed for, by marking on the scale, not the time-lines calculated from the above formulæ, but such time-lines as are displaced relatively to them by an amount, which is determined by experiments or calculation. Of course, the point of intersection of one of these time-lines with a height-line determines the correct angle of deviation only for the condition of air that obtained during the experiments, or that was taken as a basis for the calculation. When, however, the dimensions of the scale are large enough, several time-lines may be traced for each time of observation, if the different influences of different states of the weather on the trajectory of the projectile are to be taken into account.

According to the above, instruments according to the invention must have at least one line of sight, the inclination of which to the vertical is adjustable; this line must then be able to serve both for setting the angle of the field of view and for realizing the angle of deviation.

Among the instruments, that can be fitted to conform to the invention, a diopter device is particularly simple. As an example such a device is described below, which is to be held during use in the hand of the operator, and further, let the special case be assumed, in which one side of the angle of the field of view coincides with the vertical and the constant of the apparatus, $k$, is $\frac{1}{2}$.

Figure 2:
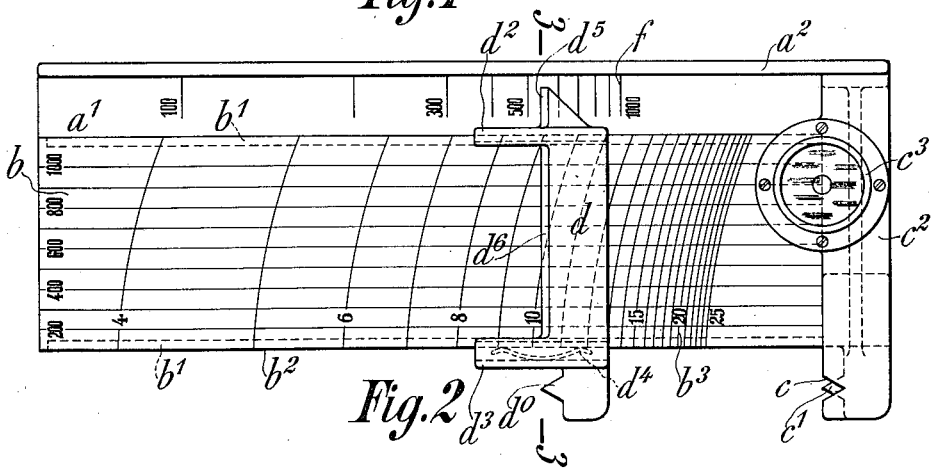
Figure 3:
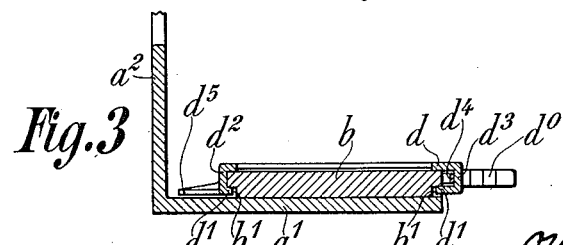

In the annexed drawing: Figure 1 is an elevation of an instrument constructed according to the invention. Fig. 2 is a plan view and Fig. 3 a cross-section through the instrument, on the line 3—3 of Fig. 2.

The frame of the instrument consists of two plates $a^1$ and $a^2$, which are at right angles to one another. The plate, $a^2$, which is of approximately triangular shape, carries at that one of its angles, which is opposite to the other rectangular plate $a^1$, a carrier $c^2$ provided with a notch $c$. A scale-table $b$ is fixed on the plate $a^1$. Opposite the notch $c$ at the same edge of the triangular plate $a^2$, but in the plane of the scale-table $b$, a fore-sight $c^1$ is disposed in such a manner that the sighting line determined by this sighting device is perpendicular to the plate $a^1$ and gives the vertical line, when the instrument is so held that a circular level $c^3$ fitted to the carrier $c^2$ indicates that the plates $a^1$ and $a^2$ are respectively in horizontal and vertical positions. A second fore-sight $d^0$, which together with the notch $c$ forms a second sighting device, the sighting line of which may be given a varying inclination to the vertical, is fitted to a slide $d$, which engages by means of the tongues $d^1$ of its side surfaces $d^2$ and $d^3$ with the grooves $b^1$ of the scale-table $b$ and can be slid on the latter parallel to the plates $a^1$ and $a^2$. A plate-spring $d^4$ provided on the side surface $d^3$ of the slide $d$ presses the latter with its side surface $d^2$ against the scale-table $b$ and prevents an unintentional displacement of the slide $d$. An index $d^5$, which projects beyond the side surface $d^2$ of the slide $d$, permits of the slide being set with respect to a scale $f$ on the plate $a^1$, each of the graduations of which scale indicates that position of the slide, in which the angle of deviation of the sighting line passing over the notch $c$ and the fore-sight $d^0$ to the vertical is equal to the angle of the field of view required for the height corresponding to the graduation. By means of a second index $d^6$ of the slide $d$, which moves across the scale-table $b$, the settings of the latter for the realization of the angle of deviation are effected. The starting points of the time-lines, lying at the edge $b^2$ of the scale-plate $b$,—marked, corresponding to the number of seconds required to fly through the angle of the field of view at different speeds, with the numerals 4, 5 . . . 25—represent the scale $b^3$ of one dimension for setting those angles of deviation of the sighting line from the vertical, which would be necessary for hitting an object on the ground, aimed at at the moment of releasing a projectile, if the said projectile were to fall *in vacuo*. In combination with the straight lines running parallel to the long edge of the scale-table, the height-lines marked 200, 300 . . . 1000, the time-lines permit of that correction of the setting of the sighting line being effected, which is necessary for taking into account, that the projectile falls in an air-filled space; and such an angle of deviation is determined, on setting the index $d^6$ of the slide $d$ on the point of intersection of a time-line (*e. g.*, as in the drawing, of the time-line belonging to 10 seconds) with a height-line (*e. g.* with the height-line belonging to 500 m.), that—if the air vessel be traveling at the height corresponding to the height-line (in the example 500 m.) at such a speed that for traversing the angle of the field of view the time corresponding to the time-line (10 seconds) is required—the object on the ground, aimed at at the moment of releasing the projectile, will be hit.

An instrument, in which the constant $k$ would not have the value $\frac{1}{2}$, but another one, *e. g.* the value 1, would need to differ from the example shown only by a different graduation of the scale $f$.

When using the instrument described, the observer must—to recapitulate the separate manipulations to be carried out by him—first of all set the sighting line in correspondence with the ascertained height of flight by the scale $f$, and determine the time taken by the air vessel to travel from a spot, from which an object on the ground, aimed at, lying in the direction of travel, appears in the direction of the said sighting line, to a spot lying vertically above the said object. Thereupon the index $d^6$ of the slide $d$ must be set on the point of intersection of that height-line, the marking of which agrees with the ascertained height of flight, with the time-line corresponding to the said time. At the moment, at which the sighting line connecting the notch $c$ with the fore-sight $d^1$ passes through the object aimed at, the projectile must be released.

I claim:

In a sighting instrument for aerial use means for sighting in directions variably inclined to the vertical, a member bearing graduations representing height values, an index connected with the said sighting means, the said member and the said index being adapted for relative movement, a second member bearing graduations representing height values and time values and a second index also connected with the said sighting means, the latter member and index being also adapted for relative movement, which latter relative movement is dependent on the relative movement of the first named member and index.

OTTO MACKENSEN.

Witnesses:
PAUL KRÜGER,
FRITZ SANDER.